(12) United States Patent
Eadie

(10) Patent No.: US 8,695,244 B2
(45) Date of Patent: Apr. 15, 2014

(54) IDENTIFICATION TAG

(76) Inventor: Brian Eadie, Selkirk (GB)

(*) Notice: Subject to any disclaimer, the term of this patent is extended or adjusted under 35 U.S.C. 154(b) by 11 days.

(21) Appl. No.: 13/142,298

(22) PCT Filed: Dec. 30, 2009

(86) PCT No.: PCT/GB2009/051778
§ 371 (c)(1),
(2), (4) Date: Sep. 21, 2011

(87) PCT Pub. No.: WO2010/076570
PCT Pub. Date: Jul. 8, 2010

(65) Prior Publication Data
US 2012/0043387 A1 Feb. 23, 2012

(30) Foreign Application Priority Data
Dec. 31, 2008 (GB) .................................. 0823691.1

(51) Int. Cl.
*G09F 3/00* (2006.01)
(52) U.S. Cl.
USPC ................................ 40/302; 40/301; 119/651
(58) Field of Classification Search
USPC ............. 119/651–656, 858; 24/704.1, 22, 16; 40/300–304, 330, 299.01
See application file for complete search history.

(56) References Cited

U.S. PATENT DOCUMENTS

| | | | | |
|---|---|---|---|---|
| 1,831,569 A | * | 11/1931 | Ker | 40/302 |
| 2,794,277 A | * | 6/1957 | Dryden | 40/302 |
| 2,924,903 A | * | 2/1960 | Dryden | 40/302 |
| 2,972,828 A | * | 2/1961 | Dumbrell | 40/302 |
| 3,346,980 A | * | 10/1967 | Wallace | 40/302 |
| D222,150 S | * | 10/1971 | McCarty | D30/155 |
| 4,060,922 A | * | 12/1977 | Reggers | 40/302 |
| 4,198,772 A | * | 4/1980 | Furutu | 40/665 |
| 4,631,231 A | * | 12/1986 | Stendel et al. | 428/413 |
| 4,697,549 A | * | 10/1987 | Hair | 119/651 |
| 4,718,374 A | * | 1/1988 | Hayes | 119/655 |
| 4,739,566 A | * | 4/1988 | Smith | 40/303 |

(Continued)

FOREIGN PATENT DOCUMENTS

| | | |
|---|---|---|
| EP | 1452089 A2 | 9/2004 |
| WO | WO-95/04455 A1 | 2/1995 |
| WO | WO-2008/075974 A1 | 6/2008 |

OTHER PUBLICATIONS

Batres Arnal, Lucia, "International Search Report", for PCT/GB2009/051778, as mailed May 26, 2010, 5 pages.

*Primary Examiner* — Shin Kim
(74) *Attorney, Agent, or Firm* — Winstead PC

(57) ABSTRACT

An identification tag (10,100) is provided which comprises a first body portion (12), a second body portion (14) and a web portion (13) located between the first and second body portions (12,14). The web portion (13) permits the second body portion (14) to be pivoted relative to the first body portion (12). The tag (10,100) further comprises a drive member (26,126) projecting from the first body portion (12). The drive member (26,126) has a drive surface (32,132) adapted to be driven, in use, by a tag loading mechanism of a tag applicator. A lock (16,22) is also provided on the tag (10,100) to lock the free ends of the first and second body portions (12,14) together after application. The drive member (26,126) may also include a fixing surface (36,136) for fixing the second body portion (14) at a chosen angle relative to the first body portion (12) prior to application of the tag (10,100) to an item.

14 Claims, 6 Drawing Sheets

(56) References Cited

U.S. PATENT DOCUMENTS

| | | | | |
|---|---|---|---|---|
| 4,878,302 A | * | 11/1989 | Jowsey | 40/302 |
| D338,040 S | * | 8/1993 | Hutchinson | D19/65 |
| 5,461,806 A | * | 10/1995 | Bristow, Jr. | 40/301 |
| 5,501,180 A | * | 3/1996 | Beere | 119/858 |
| 5,655,320 A | * | 8/1997 | Kazenski | 40/302 |
| 6,546,652 B1 | * | 4/2003 | Gardner et al. | 40/302 |
| 7,533,482 B2 | * | 5/2009 | Huenefeld | 40/301 |
| 8,166,685 B2 | * | 5/2012 | Mouille | 40/304 |
| 2003/0000119 A1 | * | 1/2003 | Savy | 40/301 |
| 2004/0103568 A1 | | 6/2004 | Steinfort et al. | |
| 2006/0260157 A1 | * | 11/2006 | Ritchey | 40/301 |

\* cited by examiner

IDENTIFICATION TAG

The present invention is directed to the field of identification tags. Although not limited to this particular use, the tags of the present invention are particularly suited to use in agriculture as an effective way of identifying livestock.

Single-piece identification tags are known in the art. These tags are typically manufactured from either metal or a plastics material. They are conventionally formed flat with a protruding pin member at one end and an aperture at the opposite end for receiving the pin member. The pin has a ridge or step that is slightly wider than both the remainder of the pin and the diameter of the aperture. When the tag is to be attached to an item it is folded in half so that at least a portion of the pin passes through the aperture, and the ridge portion of the pin is pushed through the aperture. The ridge portion cannot pass back through the aperture and so the pin is locked in the aperture and the tag is securely fixed to the item. Such tags are normally applied using a tag applicator having a pair of jaws in which the tag is inserted before attachment to an item. The jaws of the applicator can typically open to a maximum angle of 90 degrees or thereabouts so that a flat tag can be folded into the jaws. The applicator operates in the same manner as a pair of pliers or other similar hand-operated device, with an operator squeezing a lever or handle in order to press the jaws towards one another. Pressing the jaws together folds and locks the tag in the manner described above.

Some tag applicators employ automatic or semi-automatic loading mechanisms which present each new tag directly into the applicator jaws for application. Such loading mechanisms typically use a biasing means to push a set of tags towards the jaws of the applicator. However, the force applied by the biasing means to the tags often resulted in the tags twisting and jamming the loading mechanism before they reached the applicator jaws. To solve this problem, applicators can alternatively employ a loading mechanism which does not apply a constant force to the tags in the mechanism. One such example is a rotating gear wheel and ratchet arrangement, where the teeth of the gear wheel enter apertures in the tags to push the tags towards the applicator jaws as the gear wheel is rotated. However, it is possible in such an arrangement that the gear teeth will enter the gaps between successive tags in the loading mechanism instead of the apertures in the tags themselves. This can lead to tags being only partially loaded into the jaws, again jamming the loading and application mechanism.

A further problem with tags which are formed substantially flat and then folded to fit into the jaws of the applicator is that a significant amount of hand movement is required for the operator to close the jaws of the applicator and fold the resilient tag. This leaves little hand movement available to actually attach the tag to something, where the pin usually must penetrate the item to which the tag is being attached. One solution to this problem has been to pre-fold the tag so that the respective portions of the tag having the pin and aperture are at an angle of less than 90 degrees prior to being placed in the applicator jaws. Whilst this partial pre-folding leaves more of the available hand movement for actually attaching the tag, the partly folded tag can inhibit the view of the operator in the moments prior to attaching the tag. Without having a clear view of the area of the item to which they are attempting to fix the tag, the operator may inadvertently attach the tag in the wrong location, or the tag may not be properly attached to the item so that it may fall off later.

A solution to this problem has been to form the tags so that they already bent to an angle of between 90 and 180 degrees. This also ensures that less hand movement is required to fold the tag to a point where it is ready for attachment, but also ensures that the operator has a clearer view of the item immediately prior to attaching the tag than if the tag were pre-folded to less than 90 degrees. This type of tag can be manufactured from either metal or plastics, but there are inherent problems in forming the tags from either material. Metal tags of this type are usual formed in a press which provides the necessary angle between the portions of the tag. However, it has been found that the angle provided can be inconsistent when pressing the tags in this way. Similarly, plastic tags of this type are formed in a mould. Although the mould tool presents a specific angle of bend, once the tags are removed from the mould they can set at a different angle depending on the ambient conditions outside the mould. Furthermore, tags formed from different materials in the same mould can also set at different angles, due to the varying properties of the materials.

These inconsistencies in the manufacture process mean that each individual tag could potentially be formed with a different angle between the two portions of the tag. In addition, any features designed into the tags to assist the folding (e.g. transverse kinks, sections having a reduced cross sectional area) may also vary with the ambient conditions or selected material. Such inconsistencies mean that the operator may need to apply a different application force for every tag, and/or that the portions of the tag may not correctly align or locate with one another during application. This inconsistency is also a problem for multi-tag applicators which are designed to sequentially load and attach a number of tags from a tag guide or cassette. The variation in bend can mean that the tags do not sit properly in the cassette or the guide. This can cause the loading mechanism to jam during operation.

It is an aim of the present invention to obviate or mitigate one or more of the aforementioned disadvantages.

According to the present invention, there is provided an identification tag comprising:
 a first body portion, a second body portion and a web portion located between the first and second body portions which permits the second body portion to be pivoted relative to the first body portion;
 a drive member projecting from the first body portion and having a drive surface adapted to be driven, in use, by a tag loading mechanism of a tag applicator; and
 a lock adapted to lock the free ends of the first and second body portions together.

The first body portion may have a first end connected to the web portion, the first end having an upwardly projecting rib extending transversely across the first body portion.

The drive member may include a fixing surface, wherein the second body portion is adapted to be folded against the fixing surface and held by the fixing surface at an angle relative to the first body portion of the tag.

The fixing surface may hold the second portion of the tag in a friction fit. That is, friction between the second portion of the tag and the fixing surface holds the second portion of the tag at an angle relative to the first portion of the tag.

The web portion may include an opening into which the drive member projects from the first body portion.

At least part of the web portion may have a thickness which is less than that of either the first or second body portions.

The drive member may comprise a substantially vertical planar member having an upper portion projecting from an upper surface of the tag, and a lower portion projecting from a lower surface of the tag. The fixing surface may be formed on the upper portion of the drive member.

Alternatively, the drive member may form a tooth upon which the fixing surface is provided, wherein the second portion of the tag is adapted to be folded over the tooth and held by the fixing surface at an angle relative to the first portion of the tag.

The second body portion of the tag may include a resilient catch portion which is held by the tooth when the second body portion is folded past the tooth.

The tooth may project from the upper portion of the drive member.

The fixing surface may, in use, hold the second body portion at an angle of between 90 and 170 degrees relative to the first body portion. The fixing surface may hold the second body portion at an angle of between 120 and 150 degrees relative to the first body portion.

The first and second body portions and the web portion may be integrally formed.

The lock may comprise a projection formed on the second body portion, and an aperture on the first body portion which is adapted to receive the projection. The projection may include a pointed tip adapted to penetrate an item to which the tag is being attached.

The tag may include a transponder adapted to emit an identification signal. The transponder may be located in the first body portion.

Preferred embodiments of the present invention will now be described, by way of example only, with reference to the accompanying drawings, in which.

Figure 1:
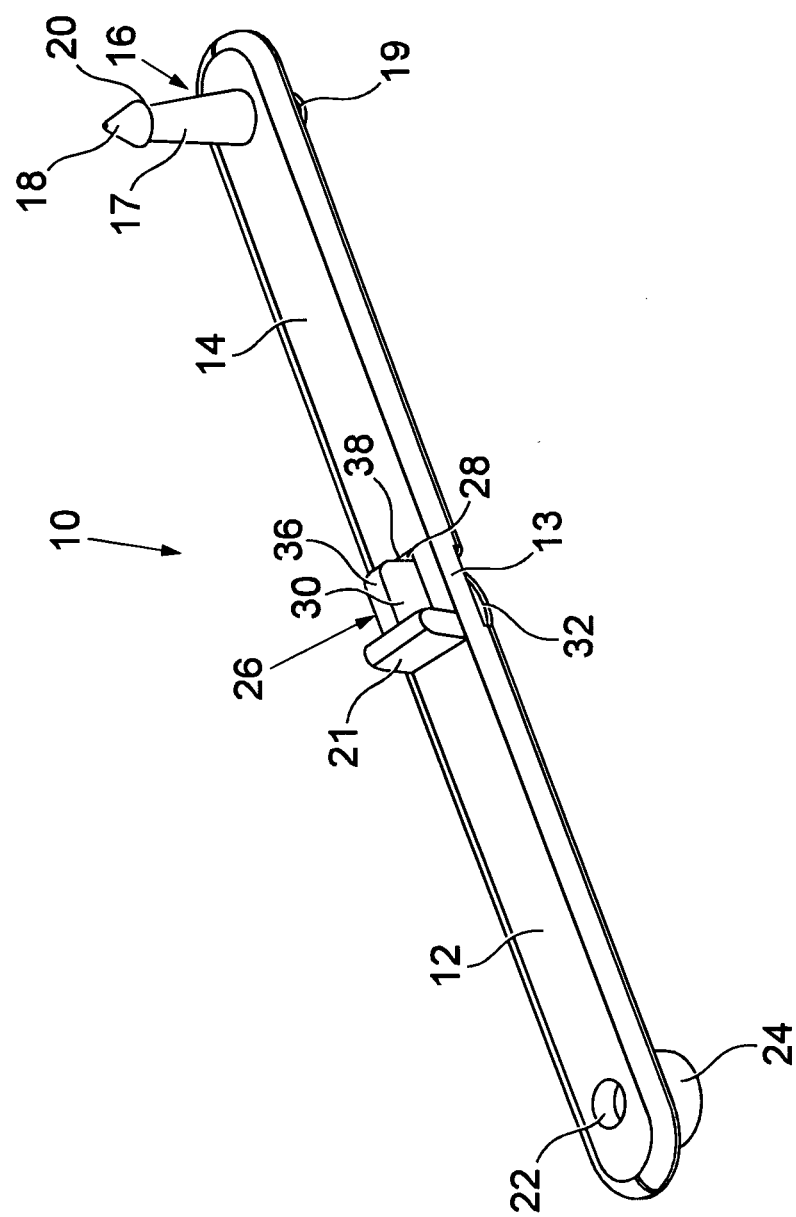
FIG. 1 is a projected view of a first embodiment of an identification tag.
Figure 2:
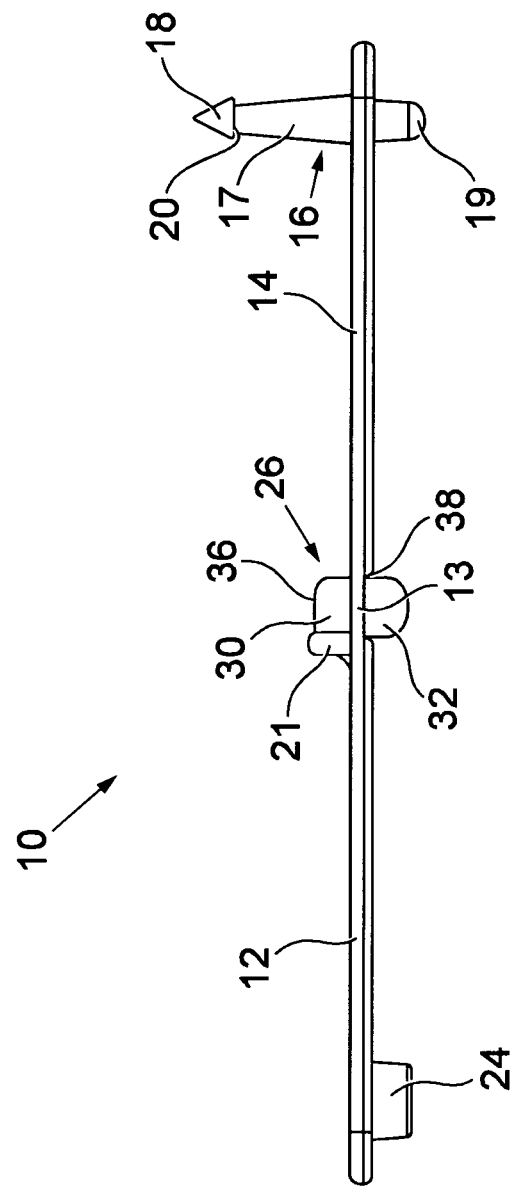
FIG. 2 is a side view of the tag of FIG. 1.
Figure 3:
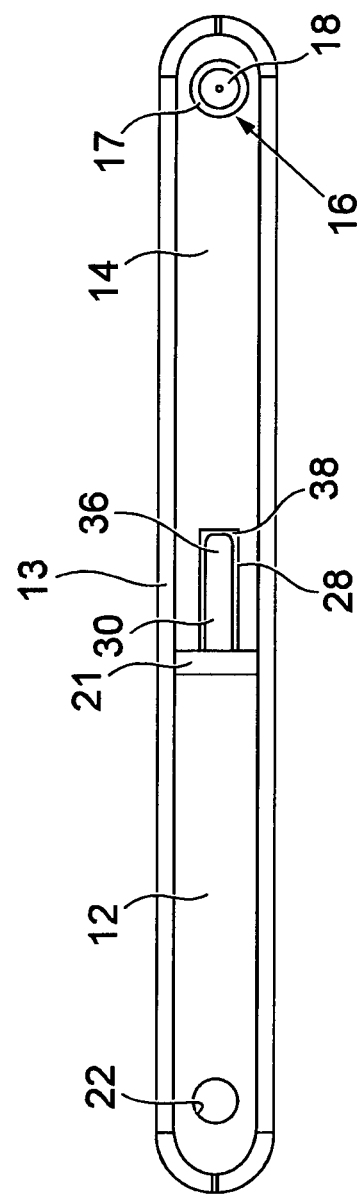
FIG. 3 is a top view of the tag of FIGS. 1 and 2.

FIGS. 1-3 show views of an identification tag, generally designated 10. The tag 10 comprises first and second elongate body portions 12,14 which are preferably integrally formed and substantially co-planar when formed. Located at the end of the first body portion 12 remote from the second body portion 14 is a locking aperture 22. As best seen in FIG. 2, the underside of the first body portion 12 includes an annular lip, or guard, 24 which projects from the underside of the tag 10 and encompasses the locking aperture 22.

The second body portion 14 includes a projection 16 located at the end of the second body portion 14 remote from the first body portion 12. As best seen in FIG. 2, the projection 16 comprises an upper part 17 and a lower part 19. The upper and lower parts 17,19 are each provided with complimentary fastening means, such as snap-fitting male and female connectors (not shown), which allow the two parts 17,19 to be attached to one another. A locating aperture (not shown) is provided at the remote end of the second body portion 14, and the two parts 17,19 of the projection are connected to one another through the locating aperture so that the projection 16 is held in place. The upper part 17 has a pointed tip 18, at least a portion of which has a larger diameter than that of a portion of the upper part 17 which is immediately adjacent the tip 18. As a result, a ridge 20 is formed at the point where the tip 18 meets the remainder of the upper part 17. The locking aperture 22 in the first body portion 12 has a diameter which is less than the diameter of the widest portion of the tip 18 of the projection 16.

The tag 10 further comprises a web portion 13 which is located between the first and second body portions 12,14 and permits pivoting of the first and second body portions 12,14 relative to one another. The first and second body portions 12,14 and the web portion 13 are preferably integrally formed and substantially co-planar when formed. As a result, the tag 10 is substantially flat when formed and ready for use. As best seen in FIG. 2, the web portion 13 of this preferred embodiment has a reduced thickness compared with the first and second body portions 12,14.

The tag 10 also comprises a drive member 26 which projects from the first body portion 12. The tag 10 also comprises an elongate slot, or opening, 28 into which the drive member 26 projects from the first body portion 12. The opening 28 is primarily located within the web portion 13. However, the second body portion 14 includes an edge, or lip, 38 which defines one end of the opening 28. The drive member 26 shown in this embodiment lies in a plane which is substantially perpendicular to the plane of the first and second body portions 12,14 and the web portion 13. As a result of this arrangement, an upper portion 30 of the drive member 26 lies above the upper surface of the tag 10, and a lower portion 32 of the drive member 26 lies below the underside of the tag 10, as can be seen in FIG. 2. The upper portion 30 of the drive member 26 includes a fixing surface 36 for supporting the second body portion 14 of the tag 10, as will be described further below. The lower portion 32 of the drive member 26 presents a drive surface upon which a loading mechanism of a tag applicator can act to load the tag(s) into the applicator.

As best viewed in FIG. 3, the drive member 26 is fixed to the first body portion 12 of the tag 10 where the first body portion 12 meets the web portion 13. The drive member 26 is not attached to either the second body portion 14 or the web portion 13, and lies within the opening 28 in such a way that it does not contact the second body portion 14 or web portion 13 when the tag 10 is in the initial position shown in FIGS. 1-3. Consequently, the drive member 26 is only fixed relative to the first body portion 12.

On the opposite side of the opening from the edge 38 is an upwardly projecting rib 21. The rib 21 extends upwardly from the surface of the first body portion 12 at a point proximate where the first body portion 12 and web portion 13 meet. The rib 21 extends transversely across the first body portion 12.

The manner in which the tag 10 is used will now be described, again with reference to FIGS. 1-3. Firstly, the first and second body portions 12,14 and web portion 13 of the tag 10 are formed. The tag 10 is preferably formed from a resilient plastics material, and the various portions of the tag are preferably formed by a suitable moulding process. The drive member 26 can be integrally formed with the remainder of the tag 10 during the moulding process, or it may alternatively be formed separately and then fixed to the first body portion 12. Once the various portions of the tag 10 have been formed, the projection 16 can be fixed in the locating aperture in the second body portion 14 using the snap-fit connection described above. The tags 10 can be formed individually, but production will be more efficient where groups of tags 10 are formed, with each tag 10 attached to an adjacent tag in the group by a spine (not shown) or the like. Once these forming steps have been taken, the tag 10 is ready for application to an item.

In the application process, the tag 10 will be placed into the jaws of an applicator. Applicators can either be single tag applicators in which each tag is placed individually in the jaws by an operator, or multi tag applicators in which a set of tags will be placed in a loading mechanism and then automatically or semi-automatically fed into the jaws of the applicator one after another. In either instance, the tags 10 are prepared for application by folding the tag 10 about the web portion 13 so that the second body portion 14 pivots relative to the first body portion 12. With the single tag applicator the initial folding will be carried out by hand. With the multi tag applicator having an automatic or semi-automatic tag loading mechanism, a specially shaped guide mechanism can be employed in order to fold the tags as they are pushed towards the jaws of the applicator. Alternatively, the tags can be folded by hand and then loaded into a conventional guide mechanism which does not itself fold the tags.

As described above, neither the second body portion 14 nor the web portion 13 are fixed to the drive member 26. As a result, the leading edge 38 of the second body portion 12 will rise up the drive member 26 as the second body portion 14 is folded. Once the edge 38 passes over the top of the upper portion 30 of the drive member 26 the second body portion 14 is prevented from returning to its starting position as the edge 38 is held on the fixing surface 36. The fixing surface 36 holds the second body portion 14 at an angle relative to the first body portion 12. The fixing surface 36 preferably holds the second body portion 14 at an angle of between 90 and 170 degrees relative to the first body portion 12, and most preferably at an angle of between 120 and 150 degrees. The fixing surface 36 therefore prevents the resilient tag 10 from returning the second body portion 14 to its initial position once the folding operation has taken place.

The folded tags 10 can then be applied to an item with a consistent angle between the first and second body portions 12,14. Where the tags 10 are to be applied by a multi tag applicator with an automatic/semi-automatic loading mechanism, the lower part 32 of the drive member 26 is used as a drive surface for the loading mechanism to push each subsequent tag into the applicator jaws.

When the tag is in the applicator jaws ready to be applied to an item, it is normal for the jaw holding the first body portion 12 to remain fixed while the jaw holding the second body portion 14 pivots relative to the other jaw in order to fold the body portions 12,14 together. As the second body portion 14 and web portion 13 pivot relative to the first body portion 12 under the action of the applicator jaws, they will come into contact with the transverse rib 21. Consequently, continued pivoting movement of the web portion 13 and the immediately adjacent section of the second body portion 14 is resisted by the rib 21 whilst the remainder of the second body portion 14 and the projection 16 continue to be pressed towards the first body portion 12 by the applicator jaws. The resistance of the rib 21 helps fold the remainder of the second body portion 14 through almost 180 degrees relative to the first body portion 12, whilst at the same time helping the operator to keep control of the tag in the applicator jaws. When the second body portion 14 reaches this point the pointed tip 18 of the projection 16 will enter the aperture 22. As the folding motion continues the ridge 20 will pass through the aperture 22 and come out on the underside of the first body portion 12. As the ridge 20 is wider than the aperture 22, it cannot pass back through the aperture 22. The projection 16 and aperture 22 therefore lock the two body portions 12,14 together. Once through the aperture 22, the tip 18 of the projection does not project beyond the guard 24. Consequently, the guard 24 ensures that the tip 18 cannot catch on anything once the tag is applied.

Depending on the item to which the tag is being applied, the body portions 12,14 can either sandwich part of the item between them, or else the tip 18 of the projection 16 can be forced through a portion of the item under the action of the applicator jaws immediately before the tip 18 enters the aperture 22. Whichever attachment method is used, the tag will be securely attached to the item which is to be identified once the tip 18 passes through the aperture 22.

Figure 4:
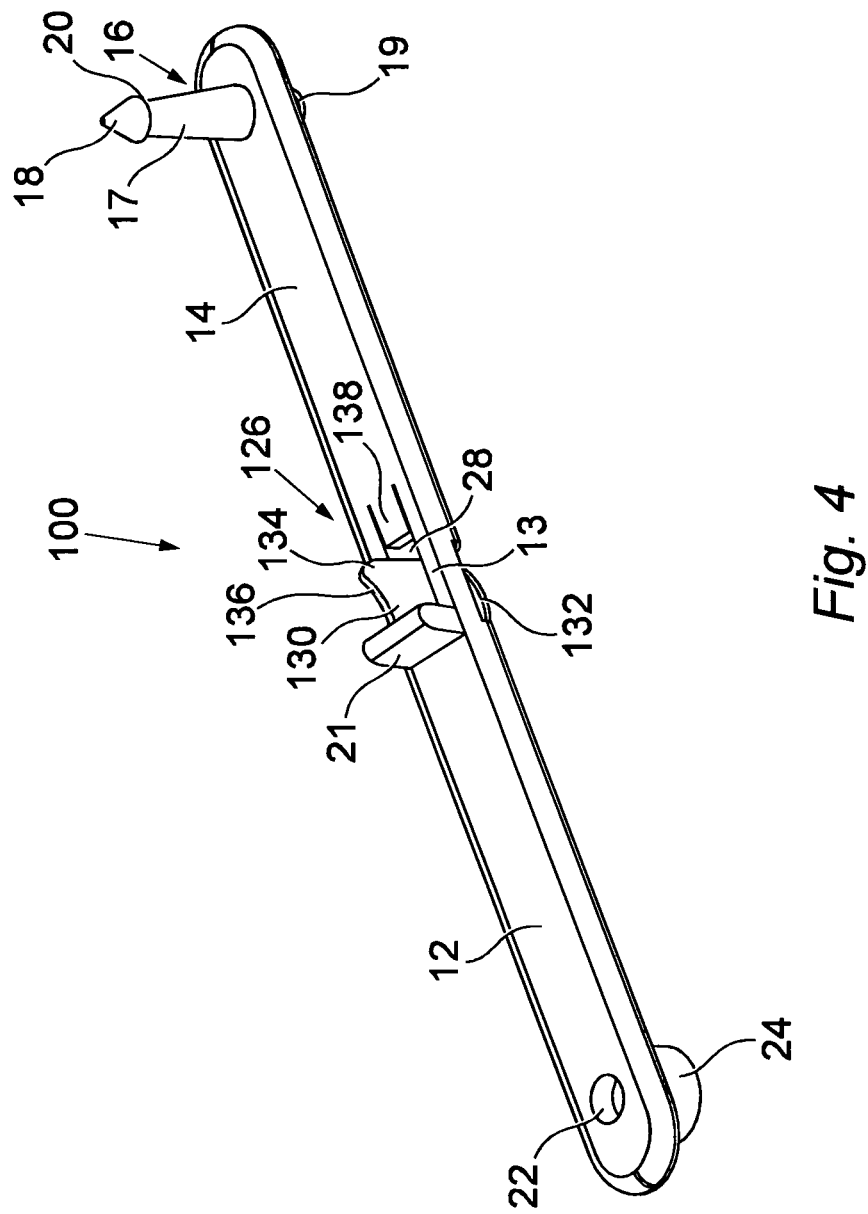
FIG. 4 is a projected view of a second embodiment of an identification tag.
Figure 5:
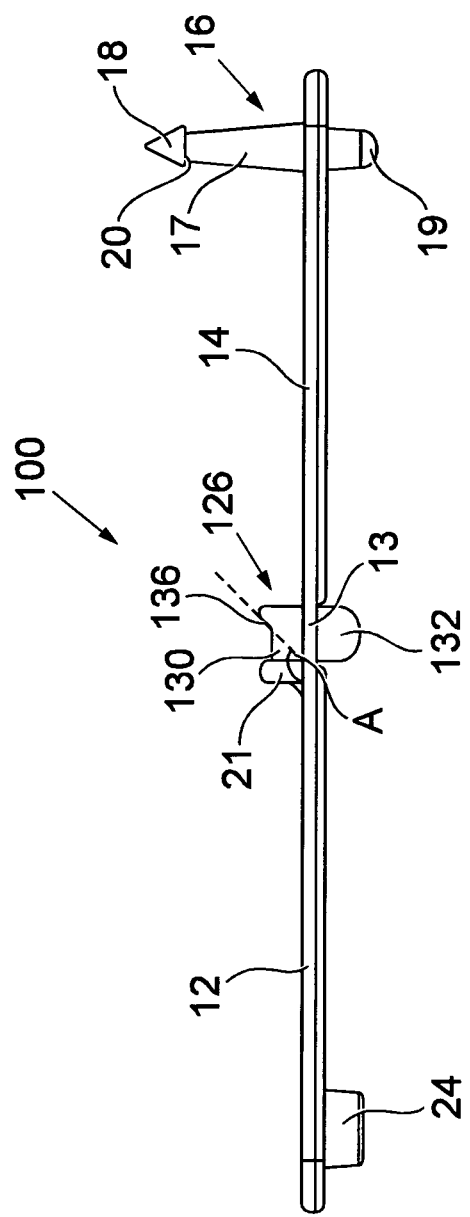
FIG. 5 is a side view of the tag of FIG. 4.
Figure 6:
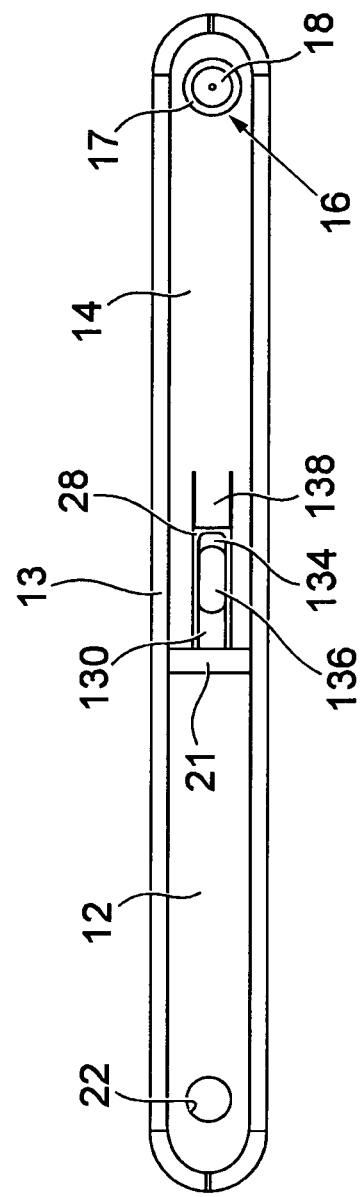
FIG. 6 is a top view of the tag of FIGS. 4 and 5.

A second embodiment of an identification tag according to the present invention is shown in FIGS. 4-6. Except for where specifically stated, the features of the second embodiment are identical to those described above in respect of the first embodiment, and consequently those features share the same reference numbers.

The tag of the second embodiment, which is generally designated 100, comprises a drive member 126 which projects from the first body portion 12. The tag 100 also comprises an elongate slot, or opening, 28 into which the drive member 126 projects from the first body portion 12. The opening 28 is primarily located within the web portion 13. However, the second body portion 14 includes a resilient catch 138 which defines one end of the opening 28. The drive member 126 shown in this embodiment lies in a plane which is substantially perpendicular to the plane of the first and second body portions 12,14 and the web portion 13. As a result of this arrangement, an upper portion 130 of the drive member 126 lies above the upper surface of the tag 100, and a lower portion 132 of the drive member 126 lies below the underside of the tag 100, as can be seen in FIG. 5.

Projecting upwards from the upper portion 130 of the drive member 126 is a tooth 134. The tooth 134 includes a fixing surface 136 which lies in a plane which is at an angle A relative to the planar upper surface of the first body portion 12. The fixing surface 136 is formed so that the angle A is preferably between 90 and 170 degrees, and most preferably between 120 and 150 degrees.

As best viewed in FIG. 6, the drive member 126 is fixed to the first body portion 12 of the tag 100 where the first body portion 12 meets the web portion 13. Hence, the angle A between fixing surface 136 and upper surface of the first body portion 12 remains substantially constant. The drive member 126 is not attached to either the second body portion 14 or the web portion 13, and lies within the opening 28 in such a way that it does not contact the second body portion 14 or web portion 13 when the tag 100 is in the initial position shown in FIG. 4-6. Consequently, the drive member 126 is only fixed relative to the first body portion 12.

The manner in which the tag 100 is used will now be described, again with reference to FIGS. 4-6. Firstly, the first and second body portions 12,14 and web portion 13 of the tag 10 are formed in the same manner as described above with respect to the first embodiment ready for application by a tag applicator. As with the tags of the first embodiment, the tags 100 are folded about the web portion 13 so that the second body portion 14 pivots relative to the first body portion 12, either by hand or by way of the specially shaped guide mechanism of an automatic or semi-automatic applicator.

As described above, neither the second body portion 14 nor the web portion 13 are fixed to the drive member 126. As a result, the resilient catch 138 of the second body portion 12 will rise up the drive member 126 as the second body portion 14 is folded. Once the catch 138 passes over the top of the tooth 134 the second body portion 14 is prevented from returning towards its starting position as the catch 138 is held on the fixing surface 136 of the tooth 134. As the fixing surface 136 is at an angle A relative to the upper surface of the first body portion 12, the fixing surface 136 holds the second body portion 14 at the angle A relative to the first body portion 12. With the preferred ranges of angle A referred to above, the fixing surface 136 preferably holds the second body portion 14 at an angle of between 90 and 170 degrees relative to the first body portion 12, and most preferably at an angle of between 120 and 150 degrees. The fixing surface 136 therefore holds the second body portion at the desired angle relative to the first body portion, and prevents the second body portion 14 from returning towards its initial position once the folding operation has taken place.

The folded tags 100 can then be applied to an item with a consistent angle between the first and second body portions 12,14. Where the tags 100 are to be applied by a multi tag applicator with an automatic/semi-automatic loading mechanism, the lower part 132 of the drive member 126 is used as a drive surface for the loading mechanism to push each subsequent tag into the applicator jaws. What happens to the tag 100 during the application process is as described above with respect to the first embodiment.

As it is provided with an angle between the first and second body portions of between 90 and 170 degrees, the identification tag of the present invention requires less force to apply it to an item. More importantly, by providing a fixing surface on the tag to hold one body portion at the desired angle relative to the other body portion, the angle between the body portions is consistently achieved. Therefore, the operator can consistently apply the same force to attach the tag. Furthermore, with each tag having a consistent angle of bend, multiple tags can be loaded into a multi tag applicator without the risk that one or more tags will jam in the loading mechanism. The applicant has determined that whilst an angle of between 90 and 170 degrees between the body portions will provide a tag which is easier to apply than flat tags or tags bent over 90 degrees, the optimum angle between the two body portions is between 120 and 150 degrees. An angle in this range offers the best compromise between reduction in application force and a clear view of the target area.

A further benefit of the present tag when used in multi tag applicators is that the portion of the drive member which projects underneath the tag acts as a single drive surface for the loading mechanism of the applicator. With a specific drive surface to act upon rather than a slot in the tag, the loading mechanism cannot mistake a gap between two tags for the slot, which can cause a misfeed of the tag into the applicator jaws.

If present, the transverse rib on the first body portion assists in the folding of the tag and at the same time provides a resistance against the web and second body portions of the tag. This means that the second body portion and projection thereon remain against, and under the control of, the pivoting applicator jaw during application. Consequently, the tags will not fall out of the jaws during application.

Where the projection provided on the second body portion is in the two-part form described above, it may be formed from a different material to the first body portion. Alternatively, the projection may be integrally formed with the first body portion, or else it may be a single part attached to the second body portion.

Where the tag must penetrate the item being tagged, which is particularly common in livestock applications, the preferred lock for the tag is the combination of pointed projection and locking aperture described above. However, where the tag has only to sandwich or clamp around a portion of an item, an alternative lock may be used instead. For example, the remote end of the second body portion may have a longitudinally extending catch which locates in a corresponding clasp at the remote end of the first body portion when the tag is folded over to 180 degrees or thereabouts.

Although it is preferable that the first and second body portions and web portion of the tag are integrally formed from a single piece of material, the present invention is not limited to this arrangement. The various portions could be formed separately and attached to one another using appropriate attachment means. Whilst the tag is preferably formed from a resilient plastics material, it may alternatively be formed from another material having suitable properties. The alternative material may be a metal such as stainless steel.

In a simplified embodiment of the present invention, the tag of the present invention may comprise a drive member which only projects from the lower surface of the tag. The face of the drive member acts as a drive surface upon which a loading mechanism of a tag applicator can act to load the tag(s). In this case the drive member does not need to include an upper portion with a fixing surface.

When present, the fixing surface of the drive member may not be provided by a projecting tooth, upper surface or corner of the drive member. Instead, the fixing surface may be on one or both sides of the upper portion of the drive member, which face in directions substantially perpendicular to the longitudinal axis of the tag. In this instance, when the tag was folded the second body portion of the tag would be held against the fixing surface(s) on the sides of the drive member by friction. In this alternative arrangement, the second body portion may therefore be held against the fixing surface at any desired angle between 90 and 170 degrees instead of the fixed angles obtained with the preferred embodiments described above.

Where necessary, the tag may include a transponder adapted to emit a specific identification signal. The transponder may be located in the first body portion of the tag.

Whilst the provision of the transverse rib on the first body portion and the reduced thickness of the web portion may individually and collectively assist in the folding of the body portions of the tag, it should be understood that neither of these features is essential to the operation of the present invention. The present invention is therefore not limited to an identification tag where one or both of these features is present.

These and other modifications and improvements may be incorporated without departing from the scope of the present invention.

The invention claimed is:

1. An identification tag comprising:
   a first body portion;
   a second body portion;
   a web portion located between the first and second body portions which web portion permits the second body portion to be pivoted relative to the first body portion responsive to the second body portion being pressed by a tag application mechanism of a tag applicator;
   a drive member disposed in a plane that is substantially perpendicular to a plane of the first body portion, the drive member projecting from the first body portion and comprising a drive surface that extends below the first body portion, the drive surface being pushed by a tag loading mechanism of the tag applicator to position the identification tag into the tag application mechanism;
   a lock that locks the first body portion and the second body portion together; and
   wherein the first body portion has a first end connected to the web portion, the first end having a rib extending transversely across the first body portion and projecting upwardly from a surface thereof.

2. The identification tag of claim 1, wherein:
   the drive member comprises a fixing surface; and
   the second body portion is adapted to be folded against the fixing surface and held by the fixing surface at an angle relative to the first body portion.

3. The identification tag of claim 2, wherein:
   the drive member comprises a substantially vertical planar member;
   the substantially vertical planar member comprises an upper portion projecting from an upper surface of the identification tag and a lower portion projecting from a lower surface of the identification tag; and the fixing surface is formed on the upper portion.

4. The identification tag of claim 3, wherein:

the upper portion comprises a tooth upon which the fixing surface is provided; and the second body portion is folded over the tooth and held by the fixing surface at an angle relative to the first body portion.

5. The identification tag of claim 4, wherein the second body portion comprises a catch portion which catch portion is held by the tooth when the second body portion is folded past the tooth.

6. The identification tag of claim 2, wherein the fixing surface holds the second body portion of the identification tag in a friction fit.

7. The identification tag of claim 2, wherein the fixing surface holds the second body portion at an angle of between 90 and 170 degrees relative to the first body portion.

8. The identification tag of claim 2, wherein the fixing surface holds the second body portion at an angle of between 120 and 150 degrees relative to the first body portion.

9. The identification tag of claim 1, wherein a thickness of at least part of the web portion is less than a thickness of the first body portion and the second body portion.

10. The identification tag of claim 1, wherein the first body portion, the second body portion, and the web portion are integrally formed.

11. The identification tag of claim 1, wherein the lock comprises:

a projection formed on the second body portion; and an aperture on the first body portion that receives the projection.

12. The identification tag of claim 11, wherein the projection comprises a pointed tip that penetrates an item to which the identification tag is attached.

13. The identification tag of claim 1, comprising a transponder adapted to emit an identification signal.

14. The identification tag of claim 13, wherein the transponder is disposed in the first body portion.

* * * * *

UNITED STATES PATENT AND TRADEMARK OFFICE
CERTIFICATE OF CORRECTION

PATENT NO. : 8,695,244 B2  Page 1 of 1
APPLICATION NO. : 13/142298
DATED : April 15, 2014
INVENTOR(S) : Brian Eadie It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 95 days.

Signed and Sealed this

Twenty-ninth Day of September, 2015

Michelle K. Lee
*Director of the United States Patent and Trademark Office*